US008897385B2

United States Patent
Ramesh

(10) Patent No.: US 8,897,385 B2
(45) Date of Patent: Nov. 25, 2014

(54) DOPPLER ESTIMATOR FOR OFDM SYSTEMS

(75) Inventor: Sridhar Ramesh, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 818 days.

(21) Appl. No.: 12/902,521

(22) Filed: Oct. 12, 2010

(65) Prior Publication Data

US 2011/0090971 A1 Apr. 21, 2011

Related U.S. Application Data

(60) Provisional application No. 61/253,433, filed on Oct. 20, 2009.

(51) Int. Cl.
*H04L 27/10* (2006.01)
*H04L 27/26* (2006.01)
*H04L 25/02* (2006.01)

(52) U.S. Cl.
CPC ........ *H04L 25/0228* (2013.01); *H04L 27/2657* (2013.01); *H04L 27/2675* (2013.01); *H04L 25/0212* (2013.01); *H04L 27/2672* (2013.01); *H04L 27/2695* (2013.01)
USPC ........... 375/284; 375/144; 375/148; 375/232; 375/349; 375/250

(58) Field of Classification Search
USPC ................. 375/130, 140–148, 229–232, 235, 375/259–261, 271, 279–285, 316, 322, 375/324–325, 329, 346–350
See application file for complete search history.

(56) References Cited

U.S. PATENT DOCUMENTS

| 6,636,574 B2 | 10/2003 | Mallette et al. |
| 6,954,421 B2 * | 10/2005 | Kuwabara et al. ............ 370/203 |
| 7,054,394 B2 | 5/2006 | Moser |
| 7,573,964 B2 * | 8/2009 | Wang et al. .................... 375/350 |
| 7,706,428 B2 * | 4/2010 | Wilhelmsson et al. ........ 375/144 |
| 7,944,999 B2 * | 5/2011 | Ma et al. ......................... 375/326 |
| 8,165,230 B2 * | 4/2012 | Ragab et al. ................... 375/260 |
| 8,270,509 B2 * | 9/2012 | Lindoff et al. ................. 375/260 |
| 2002/0054621 A1 * | 5/2002 | Kyeong et al. ................. 375/147 |

(Continued)

OTHER PUBLICATIONS

International Search Report of the International Searching Authority for Application No. PCT/US2010/052937, mailed on Dec. 8, 2010, 3 pages.

(Continued)

*Primary Examiner* — Sam K Ahn
*Assistant Examiner* — James M Perez
(74) *Attorney, Agent, or Firm* — Kilpatrick Townsend & Stockton LLP

(57) ABSTRACT

A method of estimating the Doppler spread of a communication channel includes computing a first sum defined by a difference between the pilot tones of a first group of N symbols and a corresponding pilot tones of a second group of N symbols preceding the first group of N symbols, computing a second sum defined by the pilot tones of the second group of N symbols, and computing a ratio of the first sum and the second sum for each of the N symbols of the first and second group of symbols to generate N ratios representative of the Doppler spread of the channel. The first sum is further defined by the square of the difference between the pilot tones of the first group of N symbols and the corresponding pilot tones of the second group of N symbols.

15 Claims, 4 Drawing Sheets

(56) References Cited

U.S. PATENT DOCUMENTS

| | | | | |
|---|---|---|---|---|
| 2004/0091026 A1* | 5/2004 | Nakayama | | 375/148 |
| 2004/0259514 A1 | 12/2004 | Nissila | | |
| 2005/0213679 A1* | 9/2005 | Yamagata | | 375/260 |
| 2009/0092194 A1* | 4/2009 | Wang et al. | | 375/260 |

OTHER PUBLICATIONS

Written Opinion of the International Searching Authority for Application No. PCT/US2010/052937, mailed on Dec. 8, 2010, 4 pages.

Chen et al., "A Robust Channel Estimator at the High Doppler Frequency Via Matching Pursuit Technique," 16th European Signal Processing Conference, Lausanne, Switzerland, 5 pages. (2008).

Choi et al., "A Maximum Likelihood Doppler Frequency Estimator for OFDM Systems," Institute of Electrical and Electronics Engineers International Conference on Communications, pp. 4572-4576 (2006).

"Chapter 6: Smoothing Data, Filling Missing Data, and Nonparametric Fitting," Experimental Data Analyst Documentation, Wolfram Mathematica Documentation Center, downloaded from http://reference.wolfram.com/applications/eda/SmoothingDataFillingMissingDataAndNonparametricFitting.html on Jul. 7, 2014, 32 pages.

* cited by examiner

DOPPLER ESTIMATOR FOR OFDM SYSTEMS

CROSS-REFERENCES TO RELATED APPLICATIONS

The present application claims benefit under 35 USC 119 (e) of U.S. provisional application No. 61/253,433, filed Oct. 20, 2009, entitled "Doppler Estimator for OFDM Systems," the content of which is incorporated herein by reference in its entirety.

BACKGROUND OF THE INVENTION

Channel estimation is commonly used in OFDM systems with coherent demodulation for channel equalization of the received signal. The transmitted OFDM signal includes pre-defined pilots at known sub-carrier locations, which are used for channel estimation. The transmitted pilots are sometimes scattered in the frequency domain to maintain a high utilization ratio. The receiver applies interpolation techniques to reconstruct interpolated pilots at locations where the actual scattered pilots are absent. A need continues to exist for improved estimation of Doppler spread of the channel in OFDM systems.

BRIEF SUMMARY OF THE INVENTION

A method of estimating the Doppler spread of a communication channel includes, in part, computing a first sum defined by a difference between the pilot tones of a first group of N symbols and a corresponding pilot tones of a second group of N symbols preceding the first group of N symbols, wherein N is an integer greater than one. The method further includes computing a second sum defined by the multitude of pilot tones of the second group of N symbols, and computing a ratio of the first sum and the second sum for each of the N symbols of the first and second group of symbols to generate N ratios representative of the Doppler spread of the channel.

In one embodiment, the first sum is further defined by the square of the difference between the pilot tones of the first group of N symbols and the corresponding pilot tones of the second group of N symbols. The second sum is further defined by the pilot tones of the second group of N symbols.

In one embodiment, the first pilot tones of each symbol of the first group of N symbols includes the entire set of pilot tones of the symbol of the first group of N symbols, and the second pilot tones of each symbol of the second group of N symbols includes the entire set of pilot tones of the symbol of the second group of N symbols. In one embodiment, the pilot tones of the first group of N symbols include in-phase and quadrature-phase pilot tones, and the pilot tones of the second group of N symbols include in-phase and quadrature-phase pilot tones. In one embodiment, the N ratios are normalized.

A system operative to estimate the Doppler spread of a communication includes, in part, first and second summing blocks, a memory and a processing block. The first summing block is operative to compute a first sum defined by a difference between the pilot tones of a first group of N symbols and the corresponding pilot tones of a second group of N symbols preceding the first group of N symbols, where N is an integer greater than one. The second summing block is operative to compute a second sum defined by the pilot tones of the second group of N symbols. The memory is operative to store the first and second sums. The processing block is operative to compute the ratio of the first sum and the second sum for each of the N symbols of the first and second group of symbols so as to generate N ratios representative of the Doppler spread of the channel.

In one embodiment, the first sum is further defined by a square of the difference between the pilot tones of the first group of N symbols and the corresponding pilot tones of the second group of N symbols. In such embodiments, the second sum is defined by the pilot tones of the second group of N symbols.

In one embodiment, the pilot tones of each symbol of the first group of N symbols includes the entire set of pilot tones of the symbols of the first group of N symbols, and the second pilot tones of each symbol of the second group of N symbols includes the entire set of pilot tones of the symbol of the second group of N symbols.

In one embodiment, the pilot tones of the first group of N symbols include in-phase and quadrature-phase pilot tones, and the pilot tones of the second group of N symbols include in-phase and quadrature-phase pilot tones. In one embodiment, the processing block further normalizes the N ratios.

A system operative to estimate the Doppler spread of a communication channel includes a processing unit, and a memory. The processing unit is operative to compute a first sum defined by a difference between the pilot tones of a first group of N (N is an integer) symbols and a corresponding pilot tones of a second group of N symbols preceding the first group of N symbols. The processing unit is further operative to compute a second sum defined by the pilot tones of the second group of N symbols. The processing unit computes a ratio of the first and second sums for each of the N symbols of the first and second group of symbols thereby to generate N ratios representative of the Doppler spread of the channel. The memory stores the first and second sums.

In one embodiment, first sum is further defined by a square of the difference between the pilot tones of the first group of N symbols and the corresponding pilot tones of the second group of N symbols. IN such embodiments, the second sum is defined by the pilot tones of the second group of N symbols.

In one embodiment, the pilot tones of each symbol of the first group of N symbols includes the entire set of pilot tones of the symbol of the first group of N symbols, and the second pilot tones of each symbol of the second group of N symbols includes the entire set of pilot tones of the symbols of the second group of N symbols.

In one embodiment, the pilot tones of the first group of N symbols include in-phase and quadrature-phase pilot tones, and the pilot tones of the second group of N symbols include in-phase and quadrature-phase pilot tones. In one embodiment, the processing unit is further operative to normalize the N ratios.

DETAILED DESCRIPTION OF THE INVENTION

In accordance with one embodiment of the present invention, channel estimates at scattered and interpolated pilot locations from successive symbols are used to estimate the Doppler spread of the channel. Using scattered and interpolated pilot locations to estimate the Doppler spread of the channel leads to enhanced immunity against noise and channel delay spread. The Doppler estimation algorithm is used to tune the demodulator performance in mobile and portable applications.

The Doppler estimation algorithm, in accordance with embodiments of the present invention, uses interpolated pilots to measure the channel change from symbol to symbol. Assume $H_n(k)$ is the channel estimate at the $k^{th}$ pilot sub-carrier in the $n^{th}$ symbol, then the following expression (1) is used, as described further below, to determine the Doppler estimate:

$$\frac{\sum_k |H_{n+1}(k) - H_n(k)|^2}{\sum_k |H_n(k)|^2} \quad (1)$$

As shown in the numerator of expression (1), the square of the absolute value of the difference between $H_{n+1}(k)$ and $H_n(k)$ is computed over the entire pilot tones. Likewise, as shown in the denominator of expression (1), the square of the absolute value of $H_n(k)$ is computed over the entire pilot tones. Using the above expression (1), a value associated with each pair of symbols $n^{th}$ and $(n+1)^{th}$ is obtained, where n is an integer. The root mean squared (RMS) of a predefined number of such values represents a measure of the channel change and an accurate indication of the Doppler spread of the channel. In one example, 100 symbols may be used to estimate the Doppler spread of the channel (alternatively referred to herein as Doppler spread.) In other examples, more or fewer than 100 symbols may be used to estimate the Doppler spread. The Doppler spread may be used to enable the demodulation of the received signal.

Figure 1:
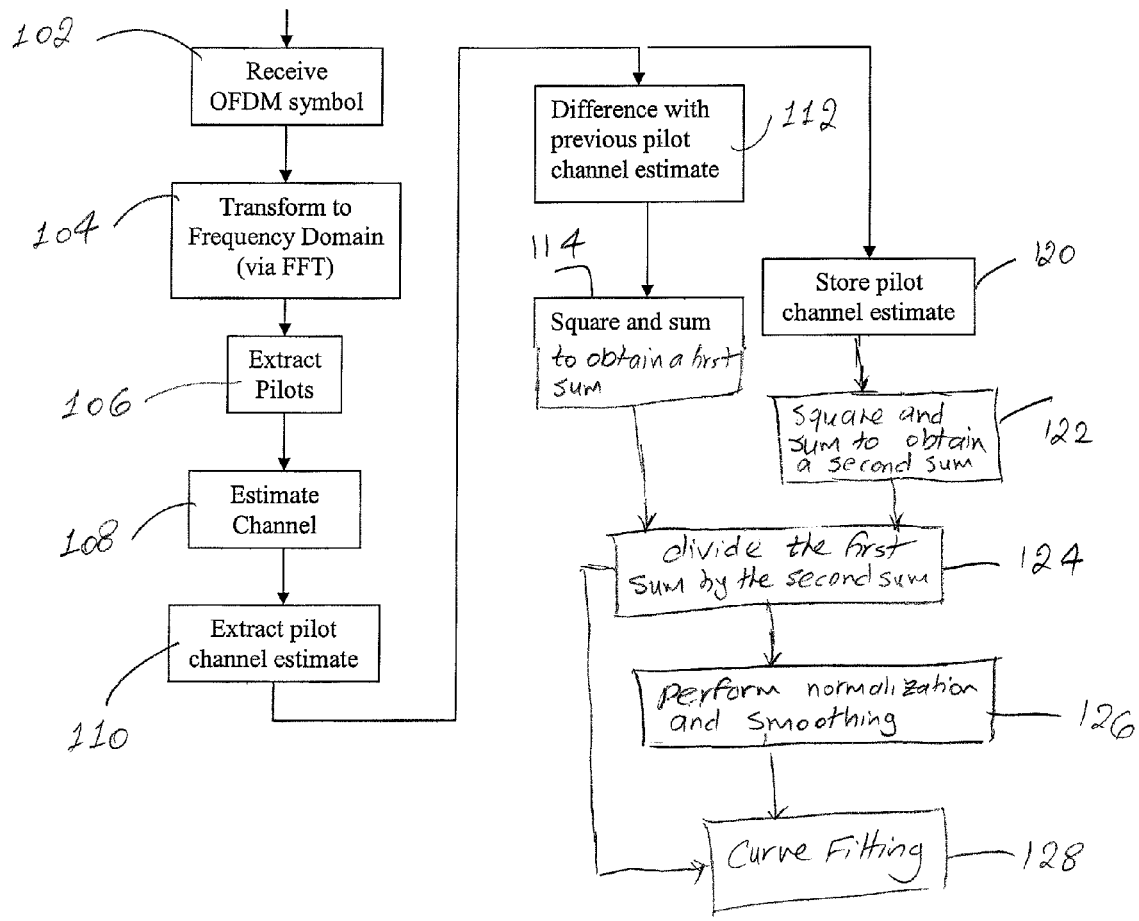
FIG. 1 is a flowchart of steps performed to estimate the Doppler spread of a channel, in accordance with one embodiment of the present invention.

FIG. 1 is a flowchart 100 of steps performed to estimate the Doppler spread of a channel, in accordance with one embodiment of the present invention. The received 102 OFDM symbols are transformed 104 from time domain to frequency domain using, for example, a fast Fourier transform. Next, the pilot tones are extracted 106 and the channel is estimated 108. Next, the extracted pilots are used to generate 110 a pilot channel estimate $H_n(k)$. The pilot channel estimate represents the estimated channel at pilot carrier locations. The pilot carriers are a sub-set of all carriers. The pilot channel estimate $H_n(k)$ is stored 120, and subsequently squared and added 122 to the pilot channel estimate obtained using other pilot tones, as shown in the denominator of expression (1). The squaring and the summation operations in act 122 when carried out over the entire pilot channel estimates results in obtaining a value corresponding to the denominator of expression (1) above.

The pilot channel estimate $H_n(k)$ obtained in 110 is then subtracted 112 from the previous pilot channel estimate $H_{n-1}(k)$ to obtain the difference between the two. This difference is thereafter squared and added 114 to the values obtained during prior operations of act 114. The squaring and the summation operations in act 114 when carried out over the entire pilot channel estimates results in obtaining a value corresponding to the numerator of expression (1) above. The ratio obtained by dividing 124 the final value (i.e., computed over all the pilot tones) of the act 114 by the final value of act 122 represents the Doppler estimate of the channel. In some embodiments, normalization and smoothing 126 operations are performed on the Doppler estimated obtained in act 124. Normalization and smoothing operations are known and are described in, for example: "A Robust Channel Estimator At The High Doppler Frequency Via Matching Pursuit Technique" by Lei Chen and Bernard Mulgrew, 16th European Signal Processing Conference (EUSIPCO 2008), August 2008, available at: http://www.eurasip.org/Proceedings/Eusipco/Eusipco2008/papers/1569104708.pdf;

Further description of normalization and smoothing are described in, for example "A Maximum Likelihood Doppler Frequency Estimator for OFDM Systems" by Yang-Seok Choi, O. Can Ozdural, Huaping Liu, and Siavash Alamouti, IEEE International Conference on Communications, 2006, ICC '06, pp. 4572-4576, June 2006, available at: http://web.engr.oregonstate.edu/~hliu/papers/COLA_ICC06.pdf;

Additional description for data smoothing is provided on the following web page: http://reference.wolfram.com/applications/eda/SmoothingDataFillingMissing-DataAndNonparametricFitting.html. The contents of all of the above three publications are incorporated herein by reference in their entirety.

Furthermore, in some embodiments, curve fitting 128 is applied to the results obtained in act 128. In some embodiments, a linear curve fitting algorithm is applied to the square root of the smoothed values. In some embodiments, after obtaining the ratios in act 124, curve fitting 128 is performed. In such embodiments, normalization and smoothing operations may be optionally performed during curve fitting 128. In some embodiments, non-linear curve fitting is applied to the values obtained in act 124 or act 126.

Figure 2:
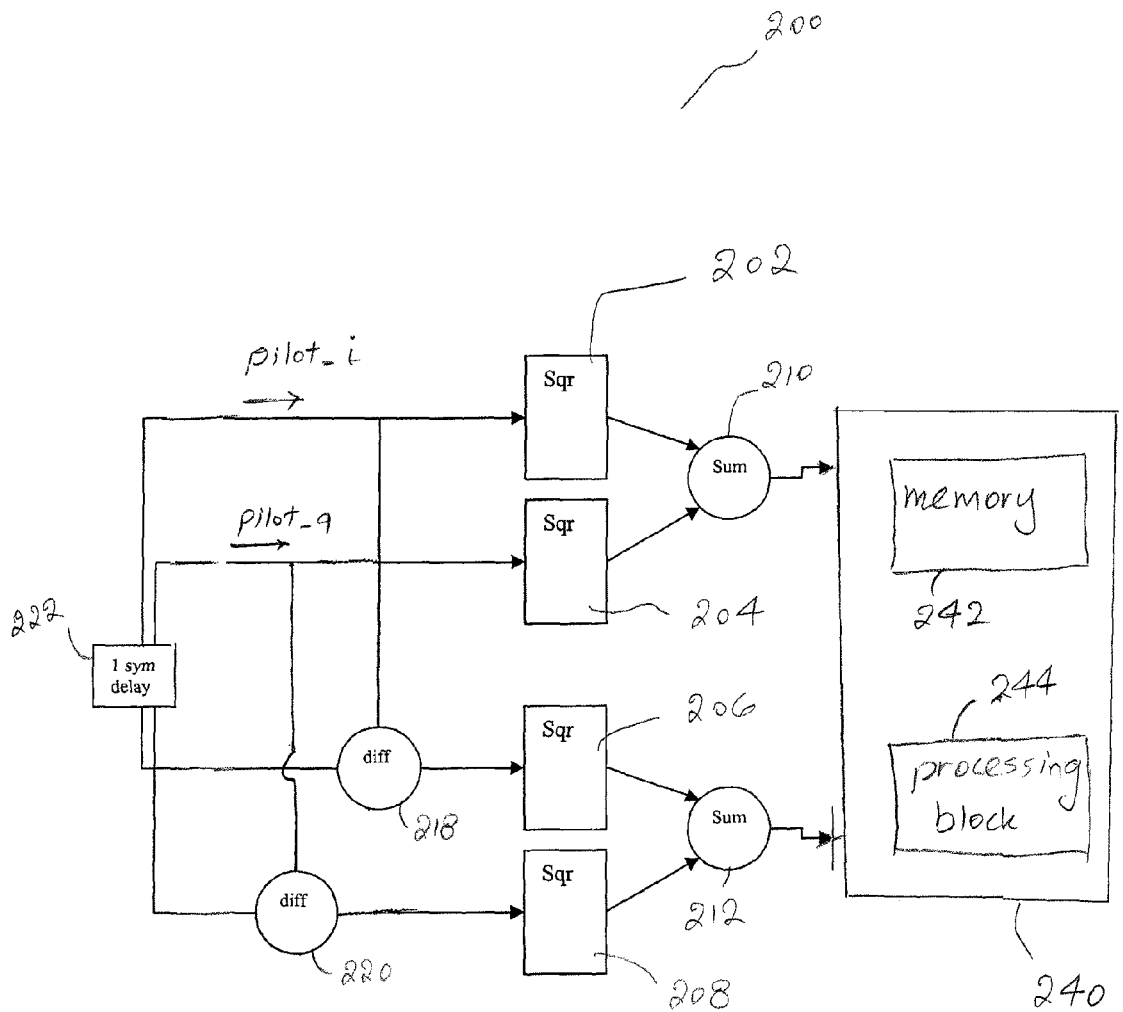
FIG. 2 is a block diagram of a system adapted to estimate the Doppler spread of a channel, in accordance with one exemplary embodiment of the present invention.

FIG. 2 is a block diagram of a system 200 adapted to estimate the Doppler spread of a channel, in accordance with one exemplary embodiment of the present invention. System 200 is shown as including squaring blocks 202, 204, 206, 208, summing blocks 210, 212, difference blocks 218, 220, processor 240, and symbol delay block 222. The in-phase component pilot_i of each pilot is squared by squaring block 202 and supplied to summing block 210. The quadrature-phase component pilot_q of each pilot is squared by squaring block 204 and supplied to summing block 210. Summing block adds the values it receives from squaring blocks 202 and 204 and stores the result in memory 242 disposed in processor 240.

Symbol delay block 222 supplies the in-phase and quadrature-phase components of the corresponding pilots of the preceding symbol to difference blocks 218 and 220 respectively. Difference block 218 computes the difference between corresponding in-phase pilots of the currently received symbol and the preceding symbol, and supplies the result to squaring block 206. Likewise, difference block 220 computes the difference between corresponding quadrature-phase pilots of the currently received symbol and the preceding symbol, and supplies the result to squaring block 208. Summing block 212 adds the values it receives from squaring blocks 206, 208 and stores the result in memory 242 of processor 240. Each data stored by summing block 210 in memory 242 corresponds to the squared value of one pilot, as shown in denominator $|H_n(k)|^2$ of expression (1). Likewise, each data stored by summing block 212 in memory 242 corresponds to the square of the difference between the current pilot and the preceding pilot, as shown in numerator $|H_{n+1}(k) - H_n(k)|^2$ of expression (1). The process of storing the data by summing blocks 210 and 212 continues for all or a subset of the pilots associated with a multitude of symbols, e.g., 100.

In one embodiment, for each symbol, processing block 244 forms the ratio of the data stored by summing block 212 and the data stored by summing block 210, in accordance with expression (1). In yet other embodiments, the processing block 244 performs this division for a subset of symbols. Processing block then generates the root mean squared (RMS) of the values associated with the predefined number of symbols, e.g., 100, to determine the Doppler spread of the channel. It is understood that in other embodiments of the present invention, a mathematical operation other than the square operation may be applied to the pilots.

As described above, an optional smoothing operation i is performed to increase the accuracy of the Doppler estimate. A normalizing function, such as $func1^{-1}$ or $func2^{-1}$ may be applied to the square root of the smoothed value of the division result. Since these estimates are obtained by averaging over a number of symbols, the noise immunity is improved.

Figure 3:
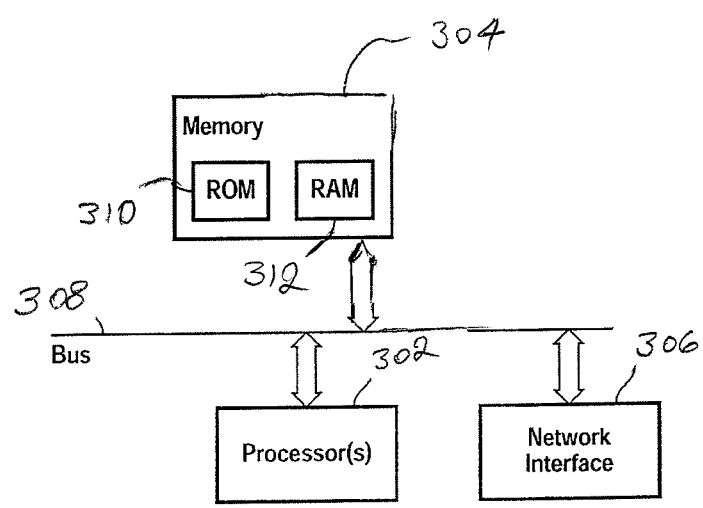
FIG. 3 is a block diagram of a system adapted to estimate the Doppler spread of a channel, in accordance with another exemplary embodiment of the present invention.

In some embodiments, estimating the Doppler spread of a channel in accordance with expression 1 is performed using software running on a computer system. FIG. 3 shows a computer system having disposed therein, in part, processor 302, memory 304, and network interface 306 that communicate with one another using bus 308. Memory 304 is shown as including ROM 310 and RAM 312.

Network interface subsystem 306 provides an interface to other computer systems, networks, and storage resources. The networks may include the Internet, a local area network (LAN), a wide area network (WAN), a wireless network, an intranet, a private network, a public network, a switched network, or any other suitable communication network. Network interface subsystem 306 serves as an interface for receiving data from other sources and for transmitting data to other sources.

Memory 304 may be configured to store the basic programming and data constructs that provide the functionality in accordance with embodiments of the present invention. For example, according to one embodiment of the present invention, software modules implementing the functionality of the present invention may be stored in memory 304. These software modules may be executed by processor(s) 302. Memory 304 may also provide a repository for storing data used in accordance with the present invention. Memory 304 may include a number of memories including a random access memory (RAM) 418 for storage of instructions and data during program execution and a read only memory (ROM) 420 in which fixed instructions are stored.

Figure 4:
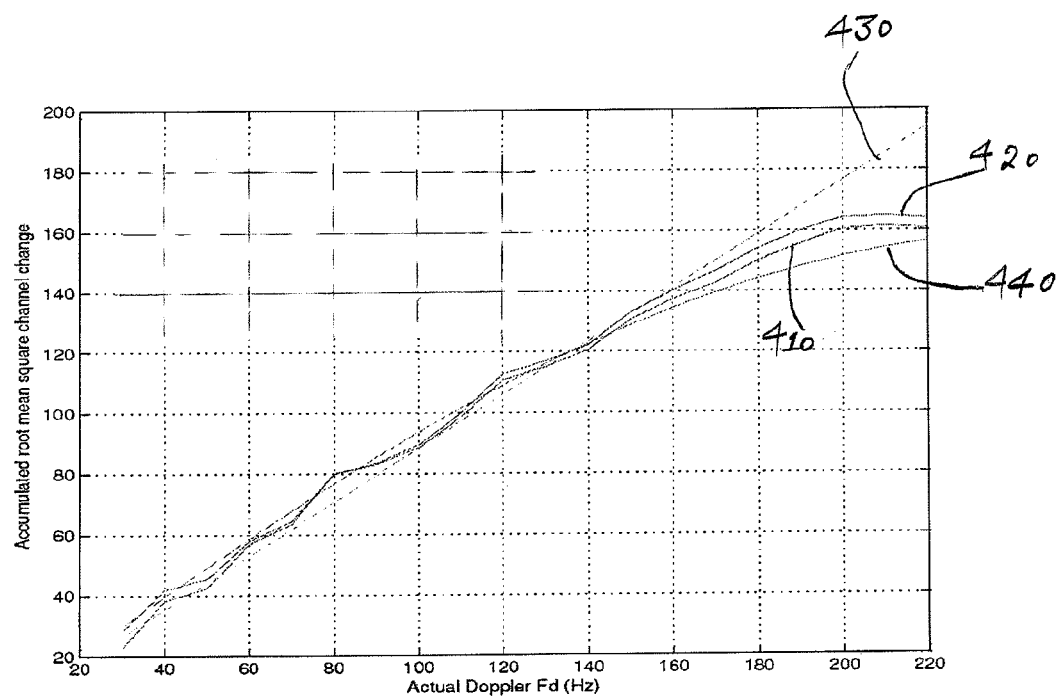
FIG. 4 shows, in part, a number of plots of a scaled RMS channel change averaged over a multitude of symbols as a function of actual Doppler spread at different signal-to-noise ratios.

FIG. 4 shows plots 410 and 420 of a scaled RMS channel change averaged over 200 symbols as a function of actual Doppler spread at SNR of 10 dB and 20 dB, respectively. Also shown are two functions of Fd, namely square root function func2 (Fd) 430 and generalized function func1 (Fd) 440. It is seen that both of these functions approximate the RMS channel change well. In one embodiment, Fd may be obtained as $func1^{-1}$ (scaled RMS channel change) or as $func2^{-1}$ (scaled RMS channel change).

The above embodiments of the present invention are illustrative and not limitative. Various alternatives and equivalents are possible. The invention is not limited by the summing block, squaring block, difference block, delay block, memory or processing block, etc. used. The invention is not limited by the number of pilot tones in each symbol. Nor is it limited by the number of symbols used to estimate the channel. The invention is not limited by the normalization function that may be used. The invention is not limited by the type of integrated circuit in which the present disclosure may be disposed. Nor is the disclosure limited to any specific type of process technology, e.g., CMOS, Bipolar, or BICMOS that may be used to manufacture the present disclosure. Other additions, subtractions or modifications are obvious in view of the present disclosure and are intended to fall within the scope of the appended claims.

What is claimed is:

1. A computer-implemented method of estimating a Doppler spread of a channel of a communication system, the method comprising:
   computing, using the computer, a first sum defined by a difference between a plurality of pilot tones of a first group of N symbols and a corresponding plurality of pilot tones of a second group of N symbols preceding the first group of N symbols, wherein N is an integer greater than one;
   computing, using the computer, a second sum defined by the plurality of pilot tones of the second group of N symbols; and
   computing, using the computer, a ratio of the first sum and the second sum for each of the N symbols of the first and second group of symbols thereby to generate N ratios representative of the Doppler spread of the channel.

2. The computer implemented method of claim 1 wherein said first sum is further defined by a square of the difference between the plurality of pilot tones of the first group of N symbols and the corresponding plurality of pilot tones of the second group of N symbols.

3. The computer implemented method of claim 2 wherein said first plurality of pilot tones of each symbol of the first group of N symbols comprises an entire set of pilot tones of the symbol of the first group of N symbols, and wherein said second plurality of pilot tones of each symbol of the second group of N symbols comprises an entire set of pilot tones of the symbol of the second group of N symbols.

4. The computer implemented method of claim 2 wherein said plurality of pilot tones of the first group of N symbols comprise in-phase and quadrature-phase pilot tones, and wherein said plurality of pilot tones of the second group of N symbols comprise in-phase and quadrature-phase pilot tones.

5. The computer implemented method of claim 2 further comprising:
   normalizing the N ratios.

6. A system configured to estimate a Doppler spread of a channel of a communication system, the system comprising:
   a first summing block configured to compute a first sum defined by a difference between a plurality of pilot tones of a first group of N symbols and a corresponding plurality of pilot tones of a second group of N symbols preceding the first group of N symbols, wherein N is an integer greater than one;
   a second summing block configured to compute a second sum defined by the plurality of pilot tones of the second group of N symbols;
   a memory configured to store the first and second sum; and
   a processing block configured to compute a ratio of the first sum and the second sum for each of the N symbols of the first and second group of symbols thereby to generate N ratios representative of the Doppler spread of the channel.

7. The system of claim 6 wherein said first sum is further defined by a square of the difference between the plurality of pilot tones of the first group of N symbols and the corresponding plurality of pilot tones of the second group of N symbols.

8. The system of claim 7 wherein said first plurality of pilot tones of each symbol of the first group of N symbols comprises an entire set of pilot tones of the symbol of the first group of N symbols, and wherein said second plurality of pilot tones of each symbol of the second group of N symbols comprises an entire set of pilot tones of the symbol of the second group of N symbols.

9. The system of claim 7 wherein said plurality of pilot tones of the first group of N symbols comprise in-phase and quadrature-phase pilot tones, and wherein said plurality of pilot tones of the second group of N symbols comprise in-phase and quadrature-phase pilot tones.

10. The system of claim 7 wherein said processing block is further configured to normalize the N ratios.

11. A system configured to estimate a Doppler spread of a channel of a communication system, the system comprising:
a processing unit configured to:
compute a first sum defined by a difference between a plurality of pilot tones of a first group of N symbols and a corresponding plurality of pilot tones of a second group of N symbols preceding the first group of N symbols, wherein N is an integer greater than one;
compute a second sum defined by the plurality of pilot tones of the second group of N symbols; and
compute a ratio of the first sum and the second sum for each of the N symbols of the first and second group of symbols thereby to generate N ratios representative of the Doppler spread of the channel; and
a memory configured to store the first and second sums.

12. The system of claim 11 wherein said first sum is further defined by a square of the difference between the plurality of pilot tones of the first group of N symbols and the corresponding plurality of pilot tones of the second group of N symbols.

13. The system of claim 12 wherein said first plurality of pilot tones of each symbol of the first group of N symbols comprises an entire set of pilot tones of the symbol of the first group of N symbols, and wherein said second plurality of pilot tones of each symbol of the second group of N symbols comprises an entire set of pilot tones of the symbol of the second group of N symbols.

14. The system of claim 12 wherein said plurality of pilot tones of the first group of N symbols comprise in-phase and quadrature-phase pilot tones, and wherein said plurality of pilot tones of the second group of N symbols comprise in-phase and quadrature-phase pilot tones.

15. The system of claim 12 wherein said processing unit is further configured to normalize the N ratios.

* * * * *